(12) United States Patent
Fukui et al.

(10) Patent No.: US 6,227,578 B1
(45) Date of Patent: May 8, 2001

(54) CORRUGATED RESIN ELBOW

(75) Inventors: Kouki Fukui; Isao Kurimoto, both of Osaka (JP)

(73) Assignee: Totaku Industries, Inc., Osaka (JP)

( * ) Notice: Subject to any disclaimer, the term of this patent is extended or adjusted under 35 U.S.C. 154(b) by 0 days.

(21) Appl. No.: 09/221,826

(22) Filed: Dec. 28, 1998

(30) Foreign Application Priority Data

Dec. 25, 1997 (JP) .................................................. 9-369514

(51) Int. Cl.$^7$ .................................................. F16L 43/00
(52) U.S. Cl. ........................... 285/179; 285/903; 285/423
(58) Field of Search .................................. 285/903, 179, 285/423, 226; 29/890.149

(56) References Cited

U.S. PATENT DOCUMENTS

| | | | |
|---|---|---|---|
| 3,076,669 | * 2/1963 | Schlein | 285/179 |
| 3,247,581 | * 4/1966 | Pellizzari | 285/179 |
| 3,503,426 | * 3/1970 | MacMillan et al. | 285/179 |
| 3,825,288 | * 7/1974 | Maroschak | 285/903 |
| 4,037,626 | * 7/1977 | Roberts | 285/903 |
| 4,752,208 | * 6/1988 | Iwata et al. | 285/903 |
| 4,810,008 | * 3/1989 | Brodie | 285/179 |
| 4,819,970 | * 4/1989 | Umehara | 285/903 |

FOREIGN PATENT DOCUMENTS

| 394 | * 1/1889 | (FR) | 285/179 |
|---|---|---|---|
| 778992 | * 7/1957 | (GB) | 285/179 |

* cited by examiner

*Primary Examiner*—Eric K. Nicholson
(74) *Attorney, Agent, or Firm*—McGuireWoods LLP

(57) ABSTRACT

A corrugated resin elbow comprises a corrugate-shaped synthetic resin pipe wall which includes a plurality of valley portions, a plurality of ridge portions and side surfaces respectively interposed between the valley portions and the ridge portions. At least one of the valley portions and the side surfaces which is disposed on the bend small diameter side of the substantially middle portion of the pipe wall in the longitudinal direction thereof is contractingly heated and deformed to thereby work the corrugate-shaped pipe wall into a bent attitude having a given angle.

11 Claims, 11 Drawing Sheets

CORRUGATED RESIN ELBOW

BACKGROUND OF THE INVENTION

1. Field of the Invention

The present invention relates to an elbow which is suitable for connecting pipes, and a method for manufacturing such corrugated resin elbow. Although not elated directly to the size of the diameter of a pipe, this invention is mainly in the bent pipe portion of a large-sized pipe having an inside diameter of the order of 1,000 mm–2,000 mm.

2. Description of the Related Art

An conventional elbow of this type and a method for manufacturing the same is shown in FIGS. 10 to 19. A synthetic resin pipe P of a desired length includes a pipe wall 1 having a spirally corrugated shape. The synthetic resin pipe member P is cut in an inclined direction along a cutting line C having a desired inclination angle as shown in FIG. 11. Then, as shown in FIG. 12, the thus cut and divided pipes are turned in the circumferential direction thereof to change the angles of the cut surfaces to thereby change the relative angle of the cut surfaces of the cut and divided pipes. Next, the cut end faces are butted against each other and are thereby connected with each other in a watertight manner (for example, see Japanese Patent Publication No. Hei. 4-44157, especially, FIG. 1).

Referring here in more particular to the accompanying drawings, to manufacture an elbow E having an angle of 45° shown in FIG. 14, the middle portion of the spirally corrugated synthetic resin pipe member P is used as a pipe blank. As shown in FIG. 10, the synthetic resin pipe member P is cut along the cutting line C inclined at an angle of 22.5° with respect to a line intersecting at right angles to the longitudinal direction of the resin pipe member P to thereby divide the pipe member P into two pipe members p and p'. One pipe member p of the thus cut and divided two pipe members is rotated by 180° in the peripheral direction thereof to change the angle of the cut surface thereof to thereby change the relative angles of the cut surfaces of the cut and divided two pipe members p and p' (See FIG. 11 and 12). The cut end faces f and f of the two pipe members p and p' are butted against each other (See FIG. 13), then both sides of the butted surface F are connected together at a plurality of positions by wire members w such as wires. Next, sheet-shaped connecting material g, which is formed of the material that is similar to the pipe material and can be fused with the pipe material, is thermally fused and is thus applied repeatedly onto the outer periphery of the butted surface F to thereby close or seal spaces existing in the spirally corrugated cut surface of the butted surface F. The inner surface side portions of the pipe members p and p' are similarly sealed to thereby connect together the two pipe members p and p' in a watertight manner, thereby manufacturing the elbow E.

Now, FIGS. 15 to 19 respectively show the time sequencing steps of a method for manufacturing an elbow having an angle of 90° shown in FIG. 19. In the present elbow manufacturing method, as shown in FIG. 15, the two sides of the middle portion of a synthetic resin pipe member P to be used as a blank are cut along two cutting lines C and C respectively inclined at angles of 22.5° and −22.5° with respect to a line intersecting at right angles to the longitudinal direction of the pipe member P to thereby cut the pipe P into two side pipe members p, p and an intermediate pipe member p'. Then, the intermediate pipe member p' is rotated by 180° in the circumferential direction thereof to thereby change the angles of the cut surfaces f' and f' thereof (See FIGS. 16 and 17). Next, the cut surfaces f and f of the two side pipe members p and p are respectively butted against the cut surfaces f' and f' of the intermediate pipe member p' (See FIG. 18). Next, the thus butted surfaces F and F are connected in a watertight manner by similar means to the above-mentioned case, thereby manufacturing the elbow E. In addition, instead of the above-mentioned sheet-shaped connecting material, a glass fiber sheet is repeatedly applied using fused resin.

As described above, since, to manufacture this type of conventional elbow E, there is employed the means in which the spirally corrugated pipe is cut at a desired angle, the angles of the thus cut surfaces are changed and the present cut surfaces are butted against each other, and the butted surfaces are connected together again in a watertight manner. However, it takes labor, time and skill to seal positively the large spaces produced in the spirally corrugated portions of the butted surfaces to thereby connect the divided pipe members in a watertight manner. Furthermore, although the elbow E is manufactured by spending such time and labor, if the elbow E is vibrated or treated improperly during transportation, or if biased loads such as uneven loads are applied to the elbow E after it is buried in the earth, then water is easy to leak in the elbow E.

SUMMARY OF THE INVENTION

The present invention aims at solving the above-mentioned problems found in such conventional elbows and methods for manufacturing the same. Accordingly, it is an object of the invention to provide an elbow having a structure entirely free from water leakage as well as a technology capable of manufacturing such elbow easily and quickly.

The above-mentioned object can be attained by a corrugated resin elbow, according to a first aspect of the present invention, comprising:

a corrugate-shaped synthetic resin pipe wall including a plurality of valley portions, a plurality of ridge portions and side surfaces respectively interposed between the valley portions and the ridge portions, in which at least one of a plurality of valley portions and the side surfaces which is disposed on the bend small diameter side of the substantially middle portion of the pipe wall in the longitudinal direction thereof is contractingly heated and deformed to thereby work the corrugate-shaped pipe wall into a bent attitude having a given angle.

In addition, the above-mentioned object can Be attained by a corrugated resin elbow, according to a second aspect of the present invention, comprising:

a corrugate-shaped synthetic resin pipe wall including a plurality of valley portions, a plurality of ridge portions and side surfaces respectively interposed between the valley portions and the ridge portions, in which at least one of adjacent ridge portions and the side surfaces between the adjacent ridge portions which is disposed on the bend small diameter side of the substantially middle portion of a pipe wall in the longitudinal direction thereof is contractingly heated and deformed, in such a manner that the side surfaces are fused together or made to come close to each other, to thereby work the corrugate-shaped pipe wall into a bent attitude having a given angle.

Further, the above-mentioned object can be attained by a corrugated resin elbow, according to a third aspect of the present invention, comprising:

a corrugate-shaped synthetic resin pipe wall including a plurality of valley portions, a plurality of ridge portions and side surfaces respectively interposed between the valley portions and the ridge portions, in which a plurality of valley portions which are disposed on the bend small diameter side of the substantially middle portion of a pipe wall in the longitudinal direction thereof are contractingly heated and deformed, in such a manner that the side surfaces disposed in adjacent to the substantially middle portion are fused together or made to come close to each other, to thereby work the corrugate-shaped pipe wall into a bent attitude having a given angle.

In these corrugated resin elbows according to any one of first to third aspect of the present invention, it is preferable that the pipe wall is a spirally corrugated form.

Further, in these corrugated resin elbows according to any one of first to third aspect of the present invention, it is preferable that the pipe wall is an annularly corrugated form.

Furthermore, in these corrugated resin elbows according to any one of first to third aspect of the present invention, it is preferable that the pipe wall has a single wall structure consisting only of a corrugated wall.

Moreover, in these corrugated resin elbow according to any one of first to third aspect of the present invention, it is preferable that the pipe wall has a double-wall structure including a corrugated main wall and a cylindrical-shaped inner wall formed in the interior of the main wall.

Note that the above-mentioned object can be also attained by a method for manufacturing a corrugated resin elbow, according to a fourth aspect of the present invention, comprises the steps of:

preparing a pipe blank which comprises a corrugate-shaped synthetic resin pipe wall including a plurality of valley portions, a plurality of ridge portions and side surfaces respectively interposed between the valley portions and the ridge portions;

heating and softening a portion of at least one valley portion which is disposed at the substantially middle portion of the pipe wall in the longitudinal direction and has a given range in the peripheral direction;

applying a bending pressure and a contracting force to the pipe wall in such a manner that the softened portion is substanatialy disposed on the bending center side and the ridge portions located in adjacent to the portion are drawn closer to each other; and cooling and solidifying the softened portion while a bending posture of the pipe wall defined by the applying step is maintained.

In the above-mentioned method according to the fourth aspect of the present invention, it is preferable that when the pipe wall is subjected to the bending pressure and the contracting force in the applying steps, the ridge portions located in adjacent to the portion are brought in contact with each other.

In addition, in the above-mentioned method according to the fourth aspect of the present invention, it is preferable to further comprise the steps of:

repeating the working process twice or more, thereby working the pipe wall into a bent attitude having a given angle.

The above-mentioned object can be also attained by a method for manufacturing a corrugated resin elbow, according to a fifth aspect of the present invention, comprising the steps of:

pipe wall including a plurality of valley portions, a plurality of ridge portions and side surfaces respectively interposed between the valley portions and the ridge portions;

heating and softening portions of at least two of the valley portions which are disposed at the substantially middle portion of the pipe wall in the longitudinal direction and each has a given range in the peripheral direction;

applying a bending pressure and a contracting force to the pipe wall in such a manner that the softened portions are substantially disposed on the bending center side and the ridge portions located in adjacent to the portion are drawn closer to each other;

cooling and solidifying the softened portion while a bending posture of the pipe wall defined by the applying step is kept maintained.

In the above-mentioned method according to the fifth aspect of the present invention, it is preferable that when the pipe wall is subjected to the bending pressure and a contracting force in the applying steps, the ridge portions located in adjacent to the portion are brought in contact with each other.

In addition, in the above-mentioned method according to the fifth aspect of the present invention, it is preferable to further comprise the steps of:

repeating the working process twice or more, thereby working the pipe wall into a bent attitude having a given angle.

The above-mentioned object can be also attained by a method for manufacturing a corrugated resin elbow, according to a sixth aspect of the present invention, comprising the steps of:

preparing a pipe blank which comprises a corrugate-shaped synthetic resin pipe wall including a plurality of valley portions, a plurality of ridge portions and side surfaces respectively interposed between the valley portions and the ridge portions;

shielding at least two of the ridge portions which is disposed in the substantially middle portion of pipe blank in the longitudinal direction;

heating and softening a given portion of at least one valley portion which is interposed between the at least two of the ridge portions in the longitudinal direction and has a given range in the peripheral direction;

applying a bending pressure and a contracting force to the pipe wall in such a manner that the given portion is disposed on the bend center side and the at least two of the ridge portions are drawn closer to each other;

cooling and solidifying the given portion while a bending posture of the pipe wall defined by the applying step is kept maintained.

In the above-mentioned method according to the sixth aspect of the present invention, it is preferable that when the pipe wall is subjected to the bending pressure and a contracting force in the applying steps, the ridge portions located in adjacent to the portion are brought in contact with each other.

In addition, in the above-mentioned method according to the sixth aspect of the present invention, it is preferable to further comprise the steps of:

repeating the working process twice or more, thereby working the pipe wall into a bent attitude having a given angle.

The above-mentioned object can be also attained by a method for manufacturing a corrugated resin elbow, according to a seventh aspect of the present invention, comprise the steps of:

preparing a pipe blank which comprises a corrugate-shaped synthetic resin pipe wall including a plurality of valley portions, a plurality of ridge portions and side surfaces respectively interposed between the valley portions and the ridge portions;

heating and softening a portion of at least one ridge portion which is disposed in the substantially middle portion of pipe blank in the longitudinal direction thereof and has a given range in the pipe peripheral direction;

applying a bending pressure and a contracting force to the pipe wall in such a manner that the softened portion is disposed on the bend center side and the softened portion is deformed and compressed; and cooling and solidifying the softened portion while a bending posture of the pipe wall defined by the applying step is kept maintained.

In the above-mentioned method according to the seventh aspect of the present invention, it is preferable that the heating step is conducted at a temperature capable of fusion bonding the pipe wall.

In addition, in the above-mentioned method according to the seventh aspect of the present invention, it is further preferable that when the pipe wall is subjected to the bending pressure and the contracting force in the applying steps, the softened portion is brought in contact with the other ridge portion.

Moreover, in the above-mentioned method according to the seventh aspect of the present invention, it is advantageous to further comprise: the steps of:

repeating the working process twice or more, thereby working the pipe wall into a bent attitude having-a given angle.

The above-mentioned object can be also attained by a method for manufacturing a corrugated resin elbow, according to a eighth aspect of the present invention, comprising the steps of:

preparing a pipe blank which comprises a corrugate-shaped synthetic resin pipe wall including a plurality of valley portions, a plurality of ridge portions and side surfaces respectively interposed between the valley portions and the ridge portions;

heating a portion of each of at least two ridge portions which is disposed in the substantially middle portion of pipe blank in the longitudinal direction thereof and has a given range in the pipe peripheral direction;

applying a bending pressure and a contracting force to the pipe wall in such a manner that the heated portions are substantially disposed on the bend center side and the heated portions are fused each other; and cooling and solidifying the softened portion while a bending posture of the pipe wall defined by the applying step is maintained.

In the above-mentioned method according to the eighth aspect of the present invention, it is preferable that the heating step is conducted at a temperature capable of fusion bonding the pipe wall.

In addition, in the above-mentioned method according to the eighth aspect of the present invention, it is preferable to further comprise the steps of:

repeating the working process twice or more, thereby working the pipe wall into a bent attitude having a given angle.

The above-mentioned object can be also attained by a method for manufacturing a corrugated resin elbow, according to a ninth aspect of the present invention, comprising the steps of:

preparing a pipe blank which comprises a corrugate-shaped synthetic resin pipe wall including a plurality of valley portions, a plurality of ridge portions and side surfaces respectively interposed between the valley portions and the ridge portions;

heating a given-length portion which is disposed at the substantially middle portion of pipe blank in the longitudinal direction and has a given range in the pipe peripheral direction;

applying fused or half fused resin material to the given-length portion which is disposed between the side surfaces of adjoining ridge portions;

applying a bending pressure and a contracting force to the pipe wall in such a manner that the resin material applied to the portion is substantially disposed on the bend center side and the side surfaces are fused together through the fuse or half-fused material;

cooling and solidifying the softened portion while a bending posture of the pipe wall defined by the applying step is maintained.

In the above-mentioned method according to the ninth aspect of the present invention, it is preferable that the heating step is conducted at a temperature capable of fusion bonding the pipe wall.

In addition, the above-mentioned method according to the ninth aspect of the present invention, it is preferable to further comprise the steps of:

repeating the working process twice or more, thereby working the pipe wall into a bent attitude having a given angle.

Note that in the method for manufacturing a corrugated resin pipe elbow according to any one of the fourth to ninth aspects of the present invention, it is preferable that the corrugated form of the pipe blank is a spirally corrugated form.

In addition, in the method for manufacturing a corrugated resin pipe elbow according to any one of the fourth to ninth aspects of the presetn invention, it is preferable that the corrugated form of the pipe blank is an annularly corrugated form.

Further, in the method for manufacturing a corrugated resin pipe elbow according to any one of the fourth to ninth aspects of the present invention, it is preferable that the pipe blank has a single wall structure consisting only of a corrugated pipe wall.

Moreover, in the method for manufacturing a corrugated resin pipe elbow according to any one of the fourth to ninth aspects of the present invention, it is preferable that the pipe blank has a double-wall structure which includes a corrugated main wall and a cylindrical-shaped inner wall formed in the interior of the main wall.

In enforcing the above-mentioned elbows having their respective structures, the corrugated shape of the pipe wall of the pipe member to be used as blank may be a spirally corrugated shape or an annularly corrugated shape. Also, the structure of the pipe wall may be a single wall structure which consists only of a single corrugated wall, or may be a double-wall structure which is composed of a corrugated main wall and a cylindrical-shaped inner wall formed in the interior of the main wall. Further, although not specially limited, preferably, the synthetic resin of the pipe member may be waterproof and weatherproof blank such as polyolefin-system resin, poly (vinyl chloride) resin or the like.

DETAILED DESCRIPTION OF THE PREFERRED EMBODIMENTS

Figure 1:
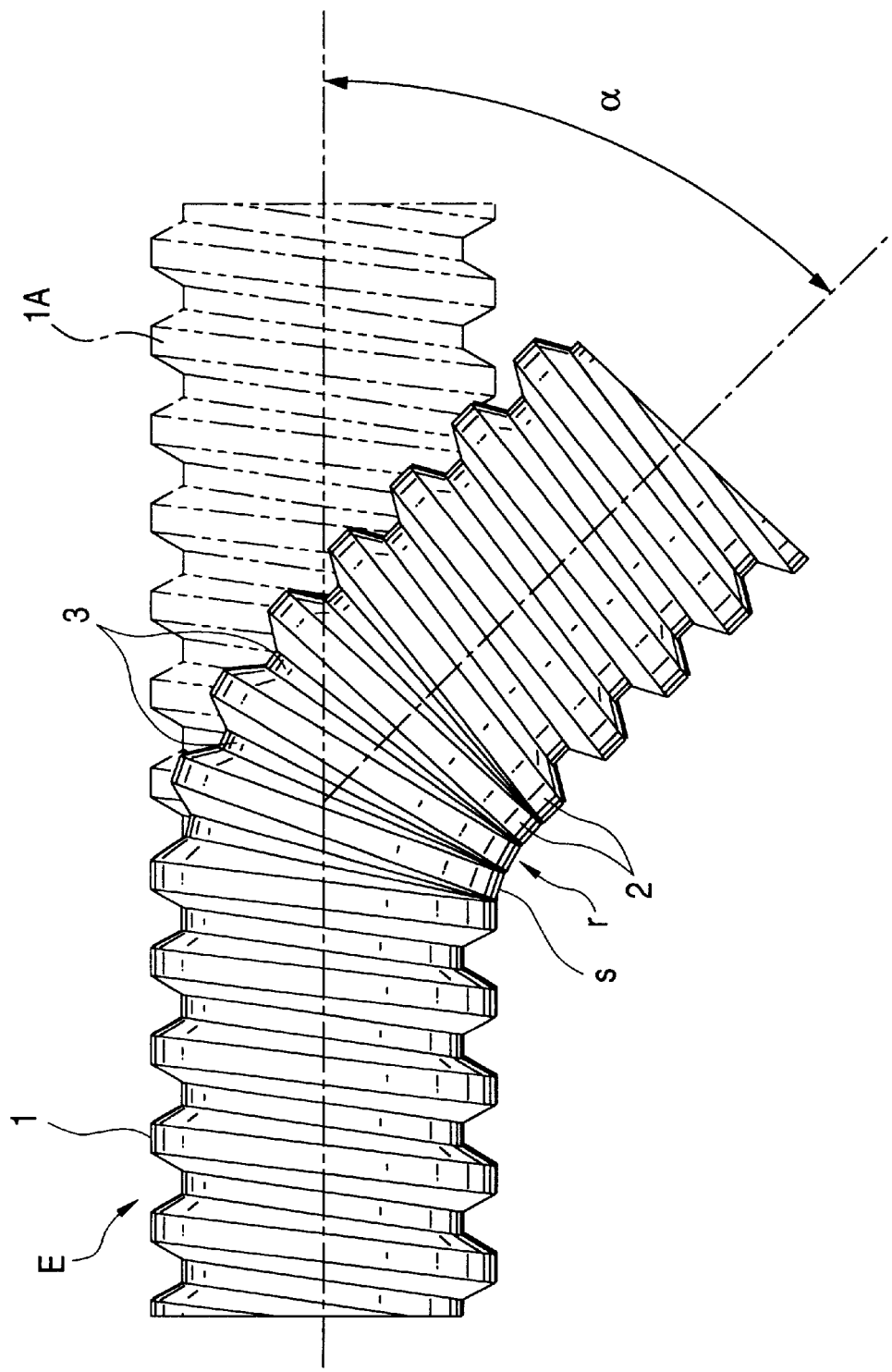
FIG. 1 is a plan view of an elbow according to a first embodiment of the invention.
Figure 2:
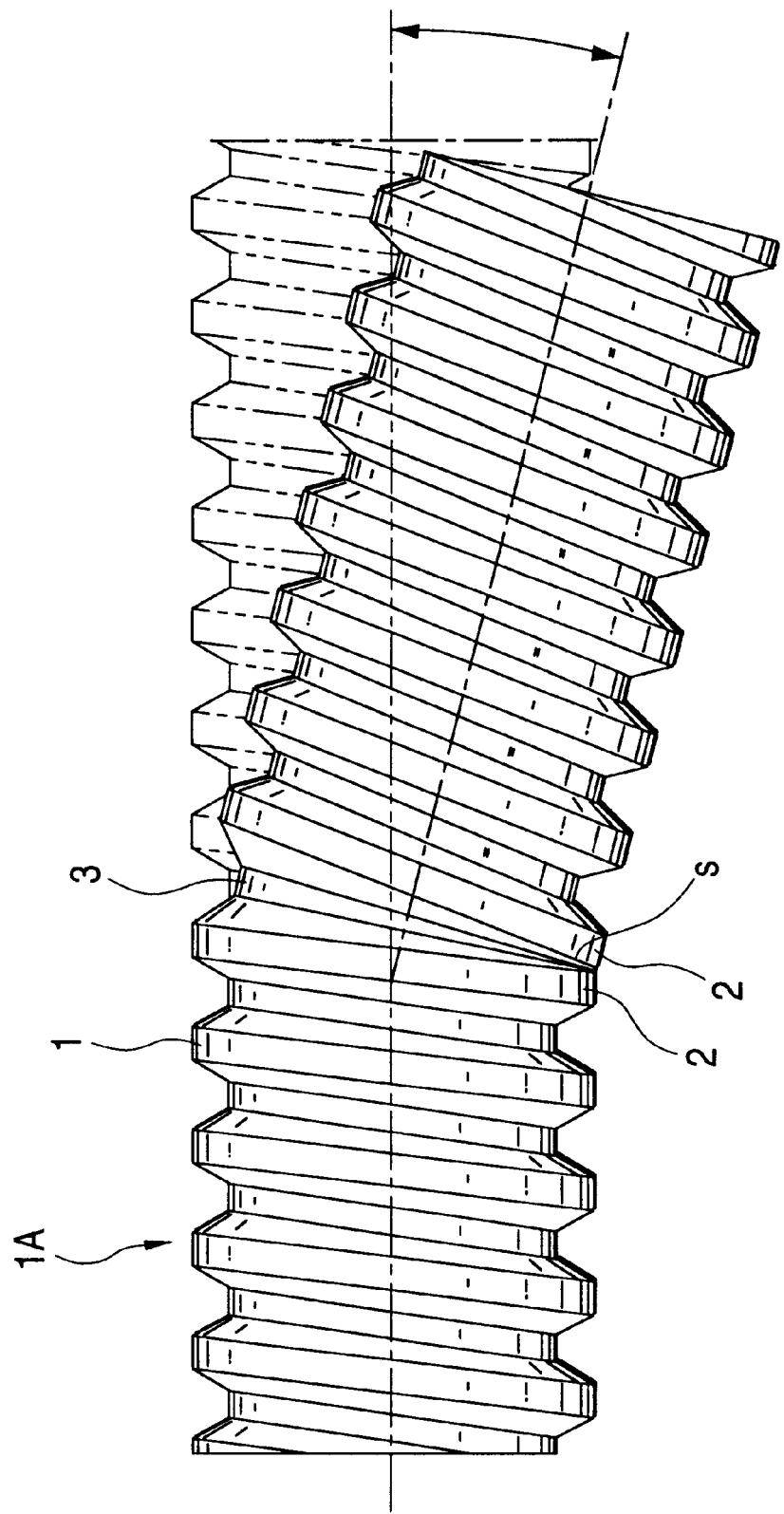
FIG. 2 is a plan view of the elbow shown in FIG. 1, showing an intermediate step of manufacturing the elbow.
Figure 3:
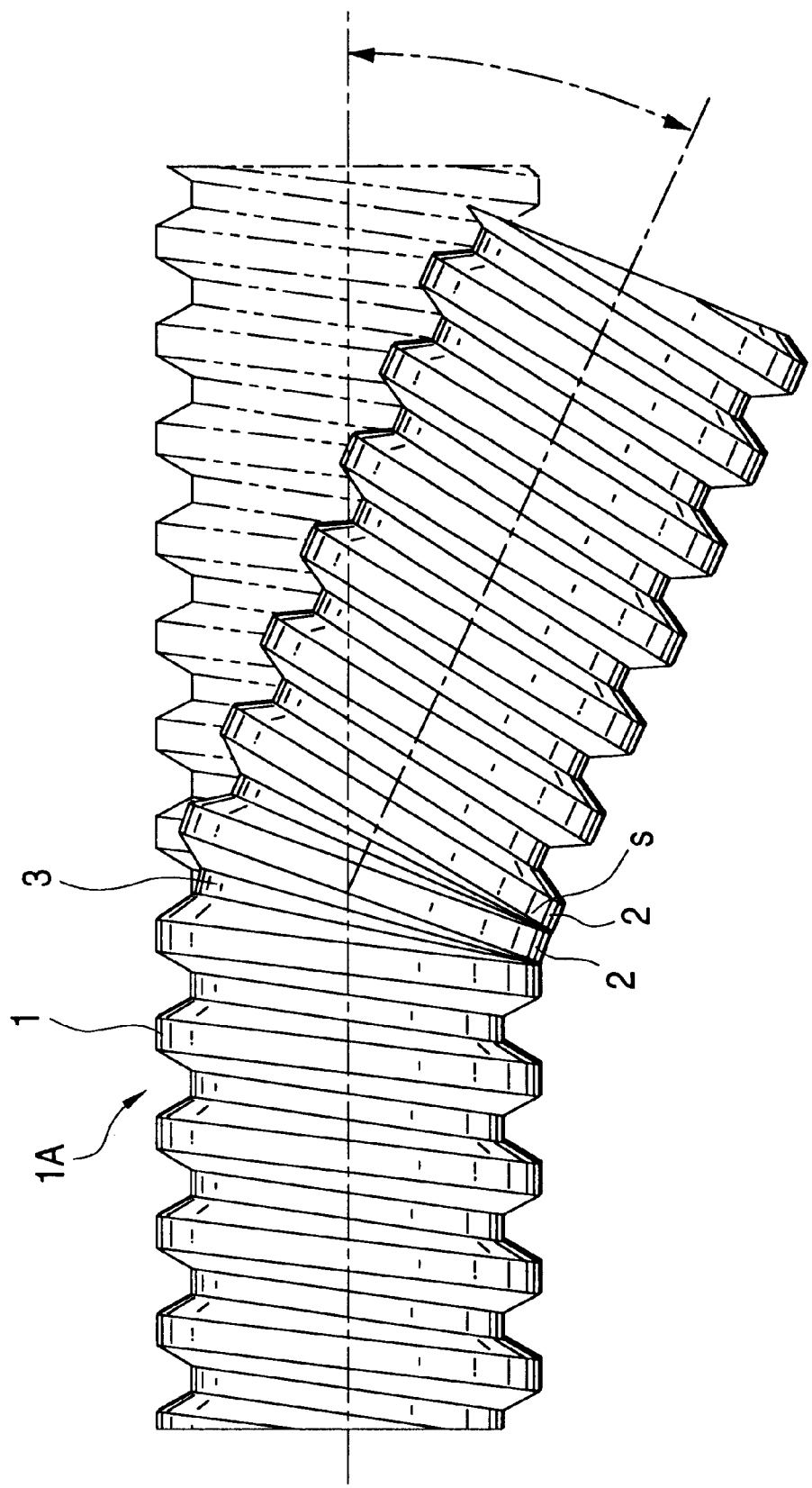
FIG. 3 is a plan view of the elbow shown in FIG. 1, showing another intermediate step of manufacturing the elbow.
Figure 4:
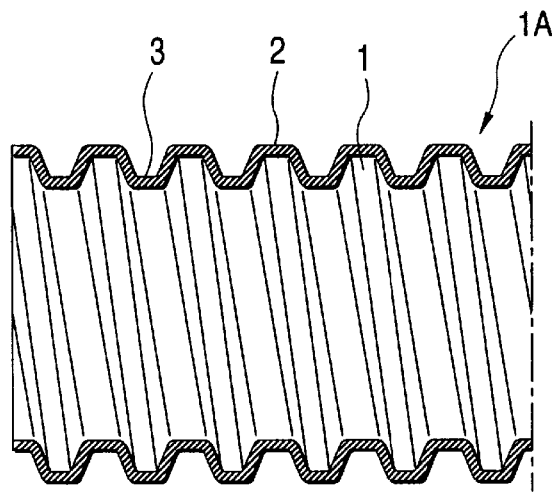
FIG. 4 is a longitudinal cross-sectional plan view of the pipe blank of the elbow at the central portion shown in FIG. 1.

Now, description will be given below of the preferred embodiments of a corrugated resin elbow and a method for manufacturing the same according to the invention with reference to the accompanying drawings. Among the drawings, FIGS. 1 to 4 respectively show a first embodiment of an elbow according to the invention. In particular, FIG. 1 shows a finished state of the elbow; FIGS. 2 and 3 respectively show the intermediate states of the elbow before finished; and, FIG. 4 shows the shape of the longitudinal cross-section in the linear portion of the elbow.

Now, referring to the dimensions of an elbow E according to the first embodiment shown in FIG. 1, the inside diameter of a pipe member is, for example, of the order of 1,000–3,000 mm and the bend angle α is 45°. In manufacturing the elbow E, as shown in FIG. 4, a pipe made of polyethylene resin is used. The polyethylene resin pipe has a single layer wall structure and is formed in a spirally corrugated shape. The polyethylene resin pipe is cut at a predetermined intervals, then the cut pipe is used as a pipe blank 1A. Next, the given-length areas of the middle portion of the pipe blank 1A are provided in the longitudinal direction thereof. Then, in particular, the respective side surfaces of the spirally corrugated five ridge portions 2, 2, of the pipe blank 1A are substantially contacted with one another on the bend small diameter side r of the pipe blank 1A, so that the central portion of the pipe blank 1A is bent at an angle of 45°.

As means for manufacturing the elbow E having the above structure, generally, there are available six kinds of means which will be discussed below. In particular, a first means (here, the terms used here "first, second,—" do not mean the superiority of the respective means in terms of engineering applications) is shown in FIGS. 1 to 3. According to the first means, firstly, the pipe blank 1A, the right half section thereof being shown by imaginary lines in FIG. 1, and one valley portion 3, locating the substantially middle portion of the pipe blank 1A in the longitudinal direction thereof, are heated by a gas burner (not shown) in the pipe peripheral direction. In this heating, two mutually opposed side surfaces across the present valley portion 3 can be also heated. The above-mentioned portions are heated in an area ranging from about a half pipe periphery to almost an entire pipe periphery with the lower side of FIG. 2 set as a center thereof. Next, the above-mentioned portions are heated and softened until a substantially middle portion s of the heated valley portion 3, the portion situated on the lower side in FIG. 2, becomes a plastically deformable state at least. It is also preferable to heat the substantially middle portion s so as to become a half fused state. Then, in a state where the two ridge portions 2 and 2 on the two sides of the portion s maintain the circular shape (that is, the spirally circular shape), a bending pressure and a contracting pressure both directed downwardly are applied to the pipe blank 1A simultaneously. When the contact pressure is applied, the softened portion s can serve as the bending center side thereof to cause the side surfaces of the ridge portions 2 and 2 on the two sides of the softened portion s to come into contact with each other or come close to each other, thereby contracting and deforming only the valley portion 3. While maintaining this state, the present valley portion 3 is cooled and solidified at normal temperature, or by applying cool wind or cool water onto the valley portion 3. Next, as shown in FIG. 3, another adjoining valley portion 3 is contracted and deformed in a similar manner. That is, the first means is means in which the above process is executed repeatedly to thereby obtain the elbow E with the bend angle thereof worked into an angle of 45°. Here, there is shown an example of the first means in which the above process is repeated four times to thereby contractingly bend and deform the four valley portions 3.

Now, referring to second means, firstly, a plurality of valley portions 3, 3, are heated and softened simultaneously to their respective pressure deformable states. Then, in a state which the two-side ridge portions 2, 2, respectively opposed to each other across their associated valley portions 3, 3, maintain their circular shapes, a bending pressure is applied to the heated valley portions 3, 3, to thereby bend and deform the plurality of valley portions 3, 3, at a time similarly to the first means. In this case, when the number of the valley portions 3 to be heated is two, as in the elbow E shown in FIG. 1, in order to obtain an elbow E in which the four valley portions 3 are contractingly bent and deformed, this process may be repeated once again. In addition, when the number of the valley portions 3 to be heated is four, the above process may be executed only once.

Now, referring to third means, the third means employs a heat shield step to be executed before the valley portions 3 of the pipe blank 1A are heated. In the third means, an iron plate or the like is used as a heat resistant member. The heat resistant member is previously mounted on the necessary ridge portions 2, 2, over a necessary range thereof in the circumferential direction of the pipe blank 1A to thereby be able to shield such ridge portions 2 from heat. That is, in the third means, on execution of the heat shield step, as in the first means, one valley portion 3 is heated, or, as in the second means, a plurality of valley portions 3, 3, are heated simultaneously to thereby heat and soften the same to a pressure deformable state and, after then, as in the above-mentioned means, a bending pressure and a contracting force are applied to the pipe blank 1A to thereby contract and deform the softened valley portions 3, with the result that the pipe blank 1A is bent and deformed into a bent attitude having a given angle.

Now, fourth and fifth means are respectively means for heating and pressure deforming the ridge portions 2 2. In particular, in the fourth means, one ridge portion 2 or a plurality of arbitrary ridge portions 2, 2, are heated. If necessary, the valley portions 3, interposed between the ridge portions 2, 2, are also heated simultaneously with the ridge portions 2, 2. By the heating, the heated ridge portions 2, are softened to a contractible and deformable state, and, similarly to the previously described means, a bending pressure and a contracting pressure are applied to the pipe blank 1A to thereby contract and deform the heated ridge portions 2, or, to thereby contract and deform the valley portions 3, simultaneously with the ridge portions 2. Then, the pipe member is worked into a bent attitude having a given angle.

In the fifth means, at least two mutually adjoining ridge portions 2, 2, are heated to the half fused states thereof, that is, weldable states. Next, similarly to the previously described means, a bending pressure and a contracting pressure are applied to the pipe blank 1A to thereby bend the half fused ridge portions 2, 2, until they are contacted with one another. After then, the ridge portions 2, 2, are welded together. In this case, if the heated ridge portions 2, 2, and/or the valley portions 3, interposed between them are deformed plastically, then the pipe member can be worked into a bent attitude having a given angle.

Now, in sixth means, the pipe member is heated until one or a plurality of the ridge portions 2 and valley portions 3 are turned into the plastically deformable states thereon although the pipe member may be heated similarly to the previously described respective means until the pipe wall thereof is turned into a half fused state. Then, a resin heated into a fused state or a half fused state is applied onto one surface or both surfaces of the ridge portions 2, 2, of the substantially middle portion s of the heated portion of the pipe member. As to the resin, it is preferable to use a resin material which has the quality same as the pipe member or easily weldable to the pipe member. Next, similarly to the previously 15 described respective means, a bending pressure and a contracting pressure are applied to the pipe blank 1A to thereby weld together the side surfaces of the present ridge portions 2, 2, through the applied fused resin. In this case, alternatively, the side surfaces of the ridge portions 2, 2, may be contacted with each other or may be made to come closer to each other and, after then, the fused resin may be applied or flown between the side surfaces to thereby weld them together.

In order to manufacture the elbow E of FIG. 1 with the pipe member thereof having an inside diameter of 1,000 mm, if a gas burner is used as a heating device, it is difficult to heat the required length range of the pipe member to be bent in the pipe axial direction, here, the four valley portions 3, or five ridge portions 2, into the softened state thereof or half fused state thereof at a time. Therefore, in this case, as described in the first means, one set of portions is chosen and heated; that is, only one valley portion 3, only one ridge portion 2, only the two mutually opposed ridge portions 2 and 2 across one valley portion 3 or both of the ridge and valley portions 2, 2, 3 is heated. After then, the chosen portions are pressurized and deformed similarly to the previously described respective means, whereby, as shown in FIG. 2, only one valley portion 3, only one ridge portion 2, only the two ridge portions 2, 2 across the valley portion 3 or only both of the ridge and valley portions 2, 2, 3 are bent and deformed. Next, similarly to the previously described cases, as shown in FIG. 3, only one adjoining valley portion 3 or only the two ridge portions 2 and 2 across the valley portion 3 are bent and deformed. By repeating such working process, even if a pipe member has a large diameter, it is possible to produce such elbow W as shown in FIG. 1.

Figure 5:
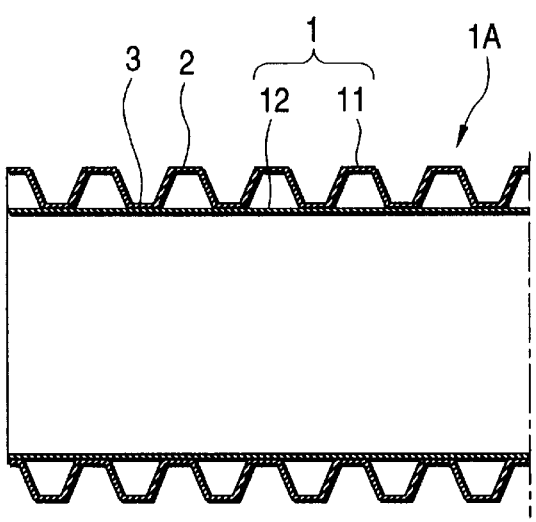
FIG. 5 is a plan view of the portion of a second pipe blank that corresponds to the portion of FIG. 4.
Figure 6:
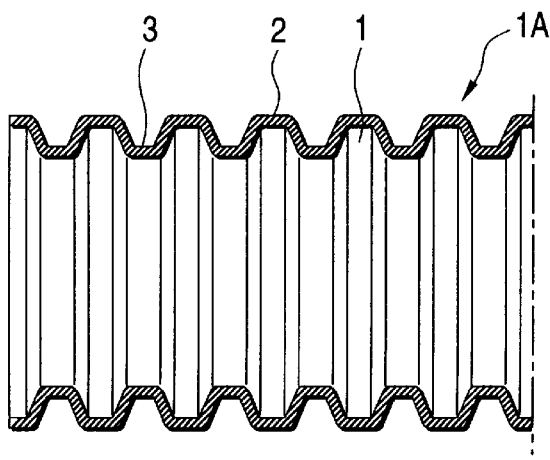
FIG. 6 is a plan view of the portion of a third pipe blank that corresponds to the portion of FIG. 4.

The pipe blank 1A is not limited to the spirally corrugated pipe having a single layer wall structure which is shown in FIG. 4, and it is also possible to use other pipe blank having different structures. Some of examples are shown in FIGS. 5 and 6. As shown in FIG. 5, it is possible to use pipe blank in which a pipe wall 1 has a double-wall structure consisting of a spirally corrugated main wall 11 and a cylindrical-shaped inner wall 12 formed in the interior of the main wall 11. On the other hand, as shown in FIG. 6, there can be used pipe blank in which the corrugated shape of the pipe wall 1 thereof is not a spirally corrugated shape but an annularly corrugated shape. It is also possible to use pipe blank in which the pipe wall thereof is a double-wall structure including an inner wall formed in the interior of the annularly corrugated wall.

Figure 7:
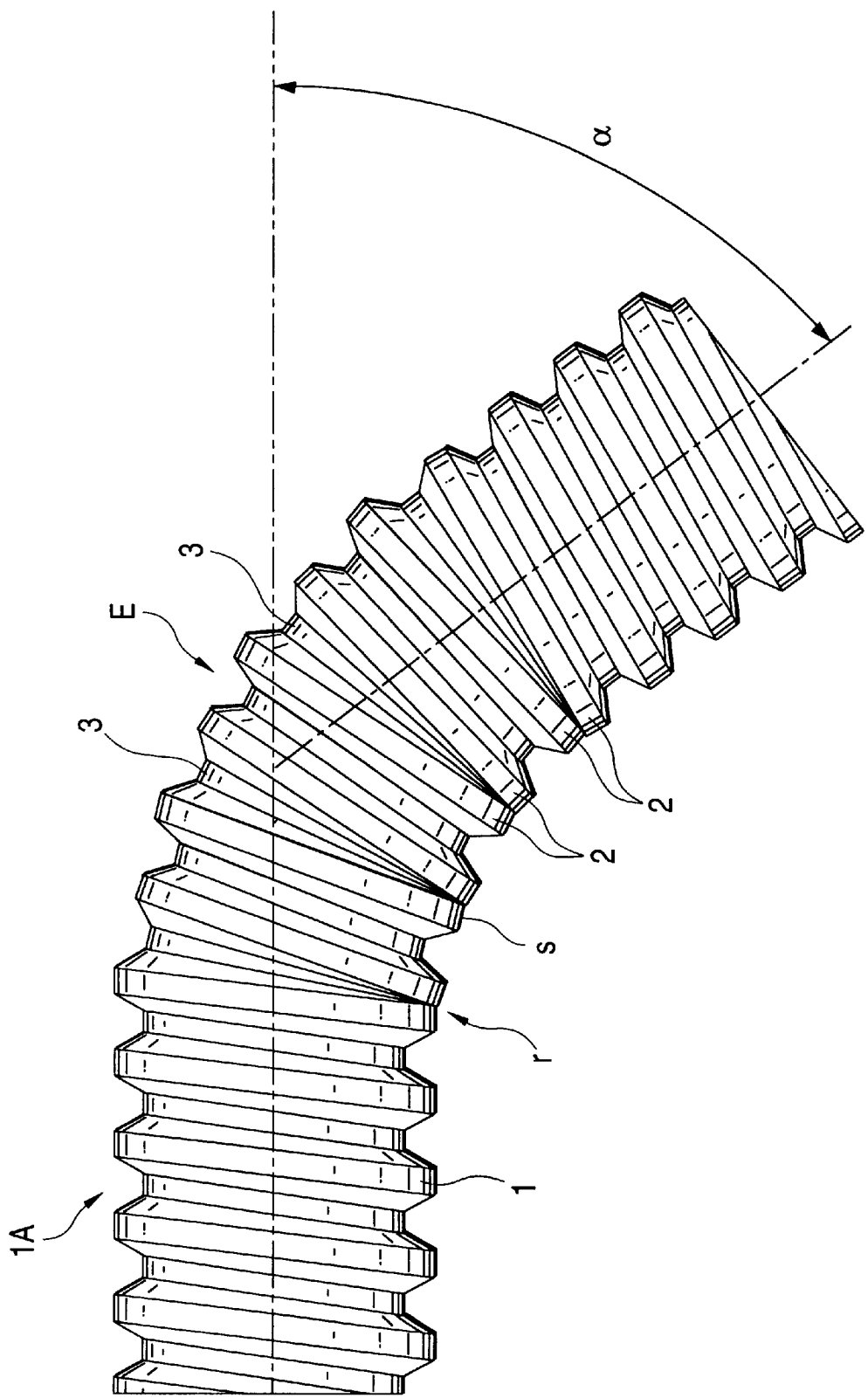
FIG. 7 is a plan view of an elbow according to a second embodiment of the invention, corresponding to FIG.
Figure 8:
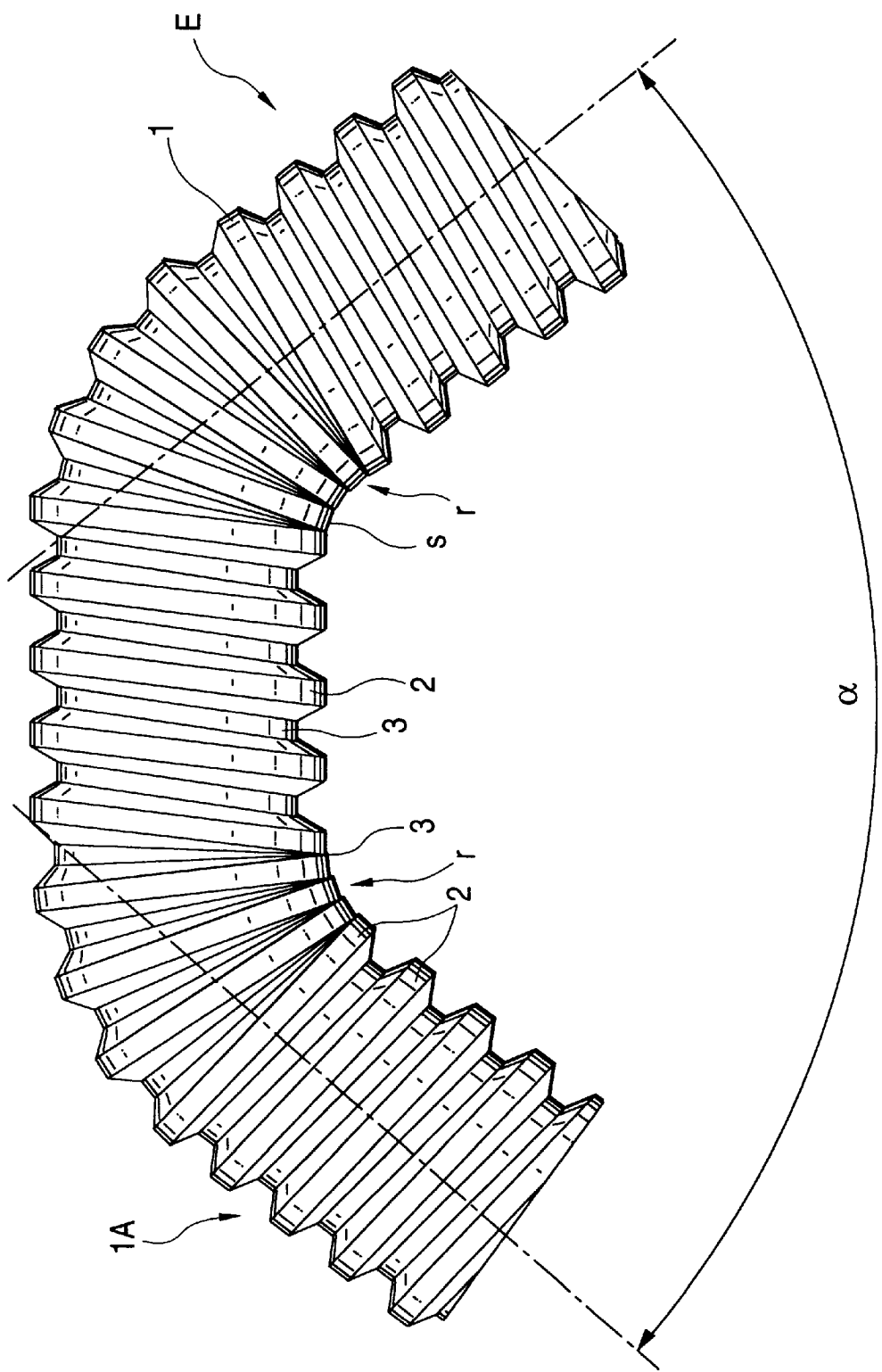
FIG. 8 is a plan view of an elbow according to a third embodiment of the invention, corresponding to FIG. 1.
Figure 9:
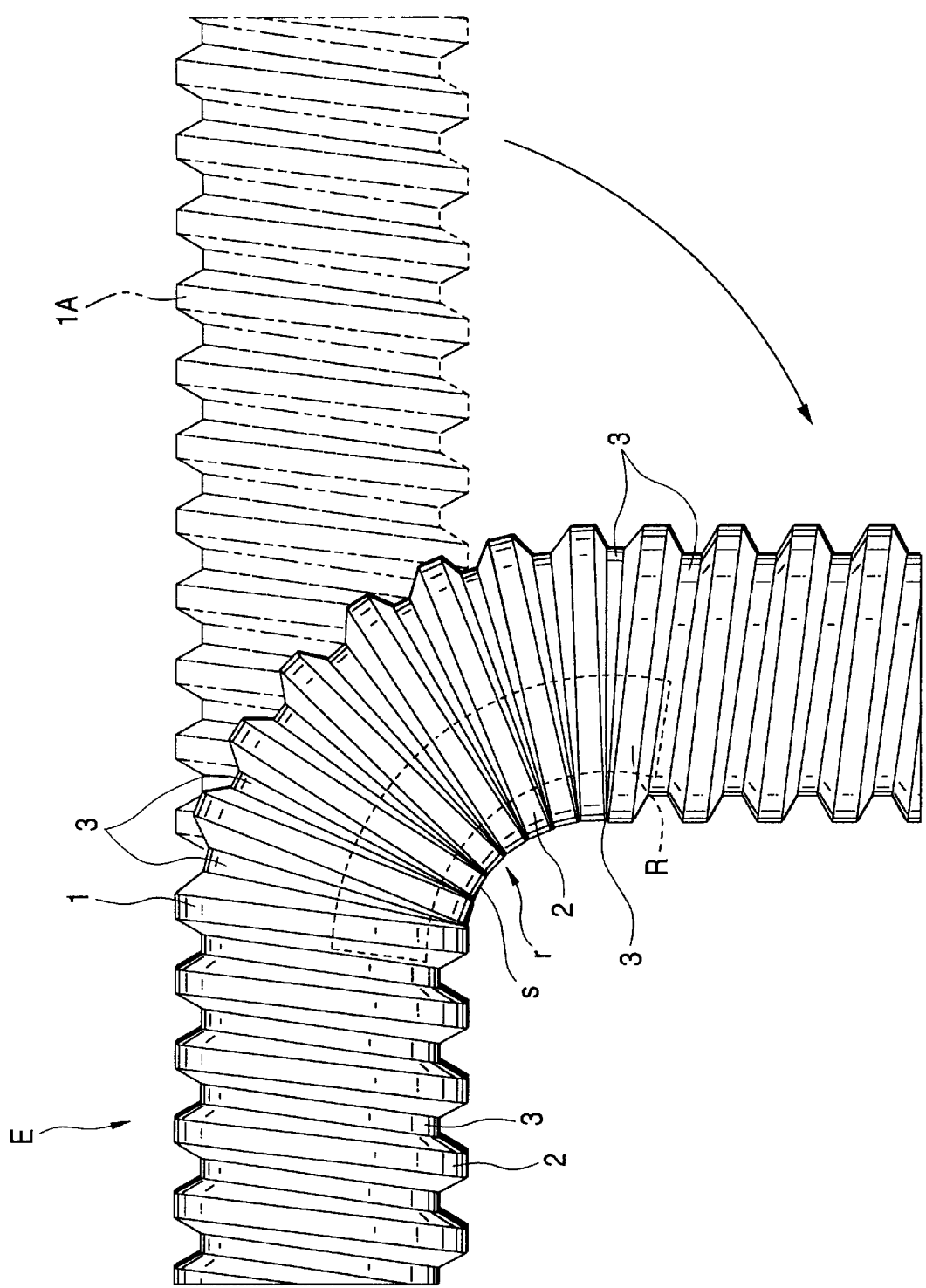
FIG. 9 is a plan view of an elbow according to a fourth embodiment of the invention, corresponding to FIG. 1.
Figure 10:
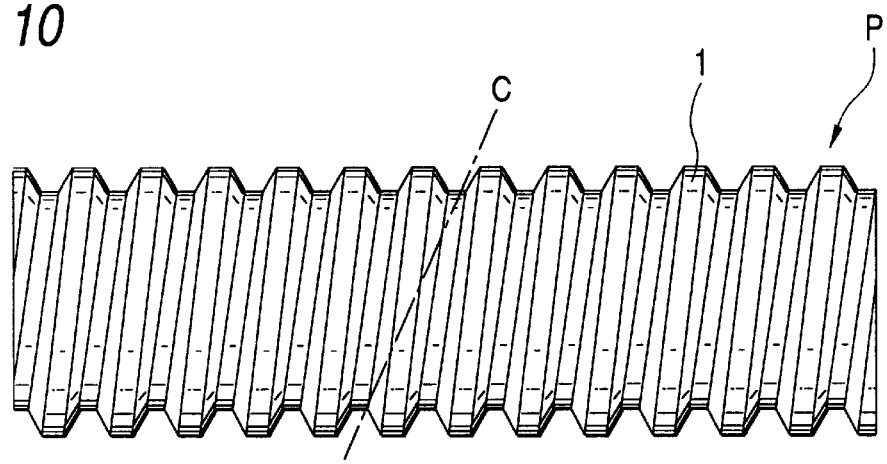
FIG. 10 is a plan view of a conventional pipe blank for manufacturing an elbow.
Figure 11:
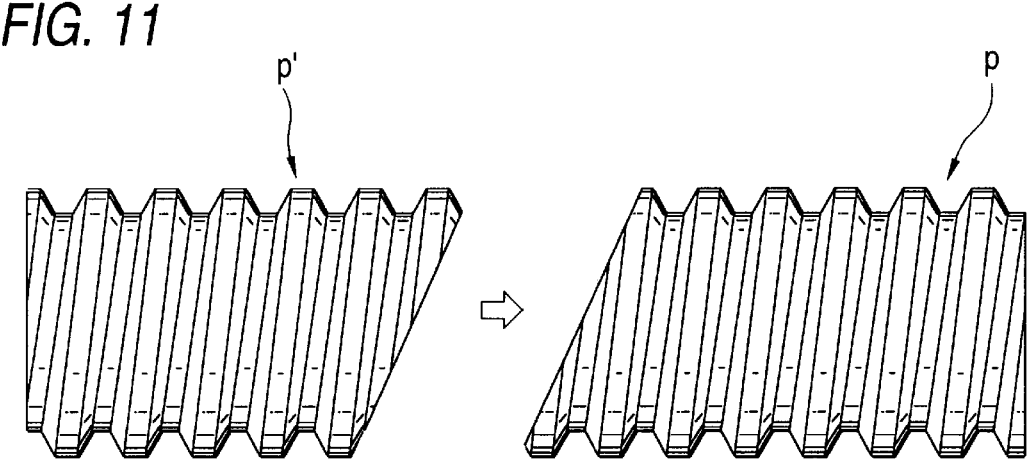
FIG. 11 is a plan view of the conventional pipe blank shown in FIG. 10, showing the cut state thereof.
Figure 12:
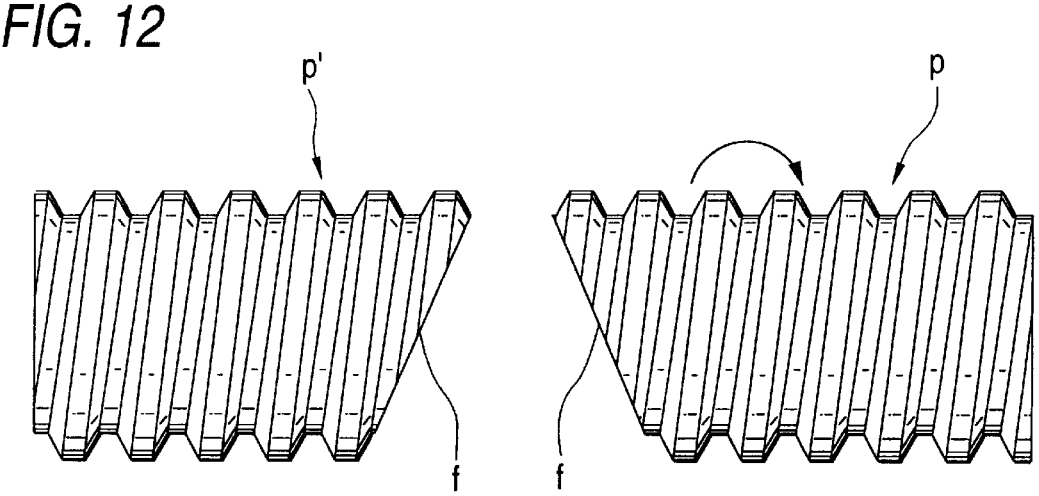
FIG. 12 is a plan view of the pipe blank shown in FIG. 11, showing the state thereof after the posture is changed.
Figure 13:
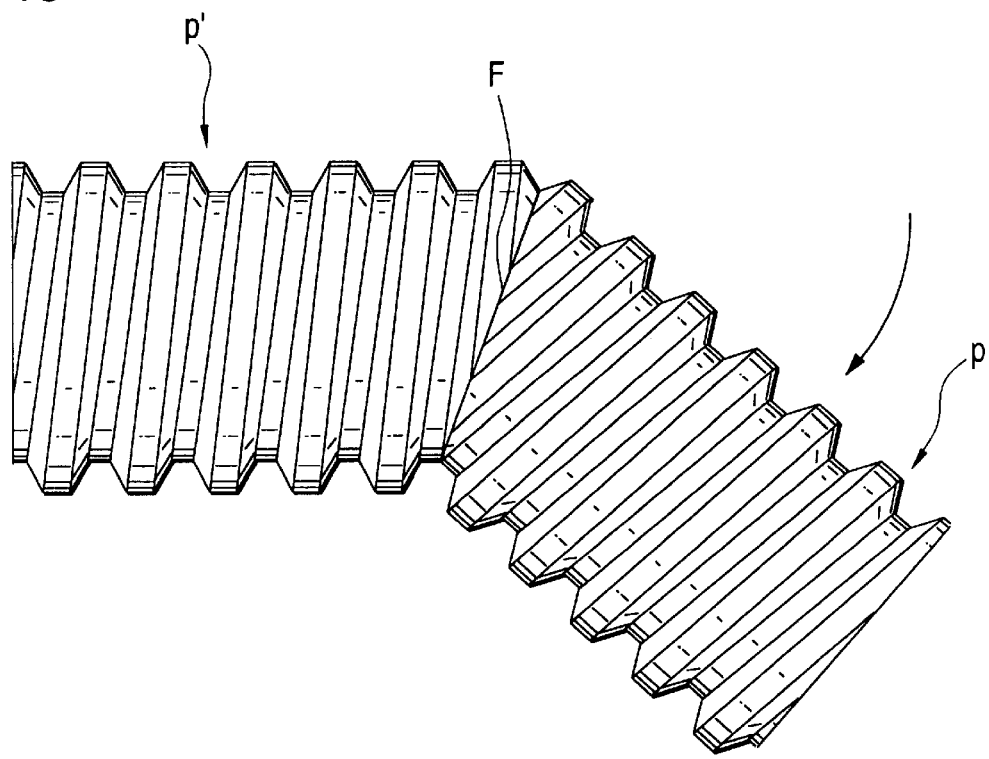
FIG. 13 is a plan view of the pipe blank shown in FIG. 12, showing the state thereof after the posture is changed.
Figure 14:
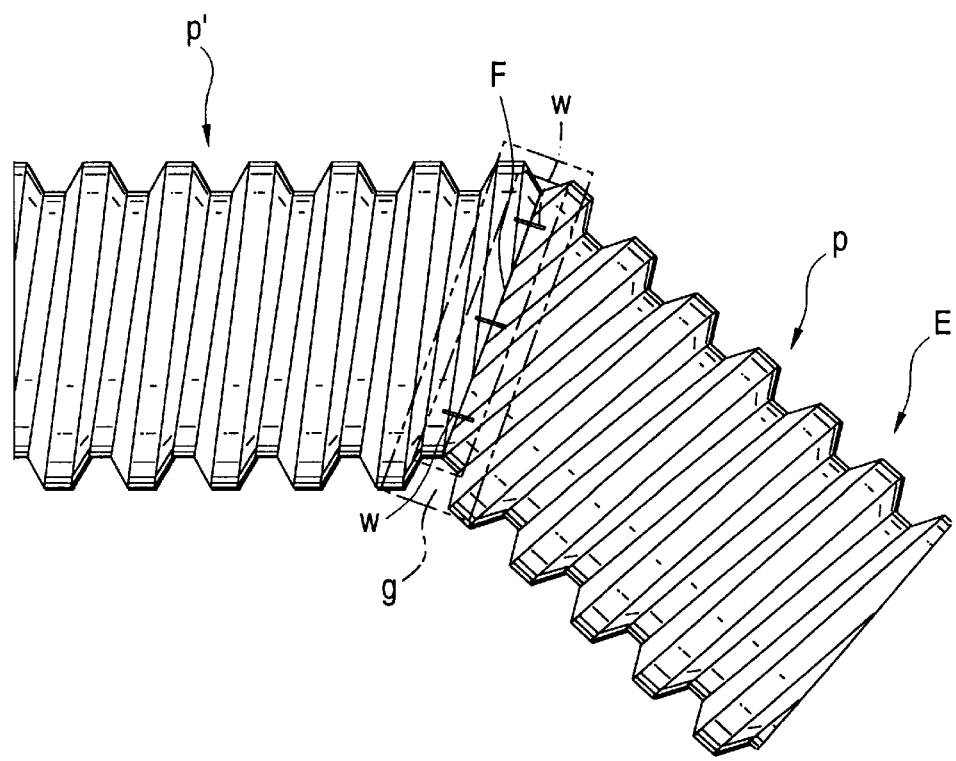
FIG. 14 is a plan view of a conventional elbow in which the pipe blank shown in FIG. 13 is connected.
Figure 15:
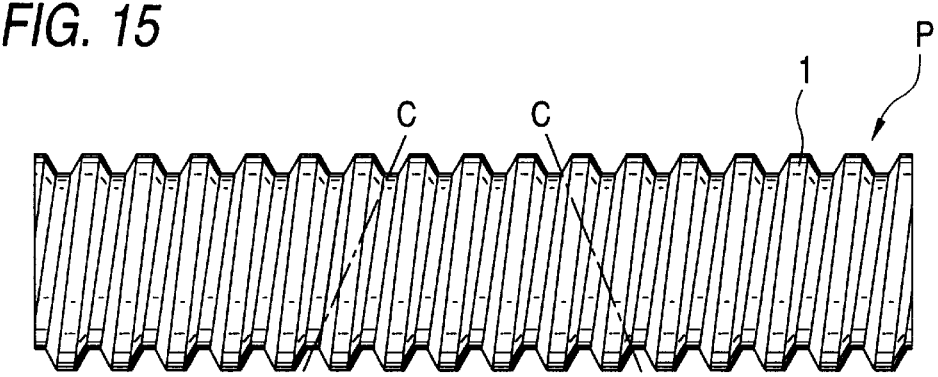
FIG. 15 is a plan view of another conventional pipe blank for manufacturing an elbow.
Figure 16:
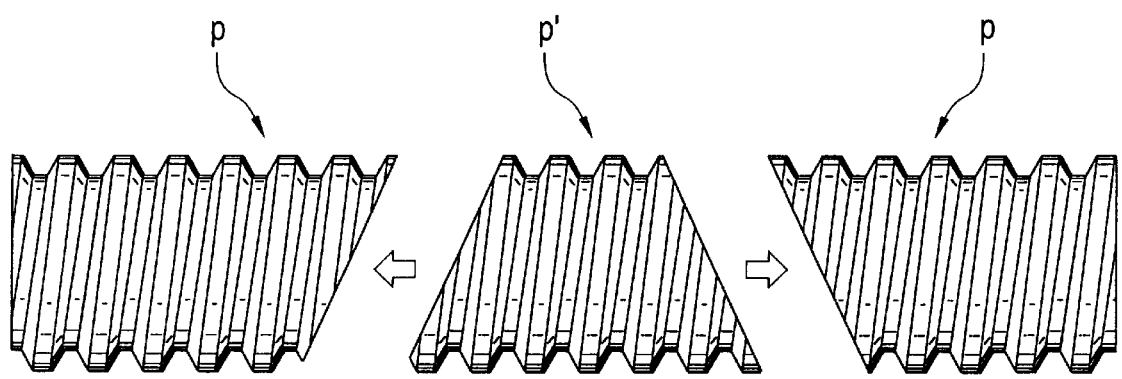
FIG. 16 is a plan view of the pipe blank shown in FIG. 15, showing the state thereof after the posture is changed.
Figure 17:
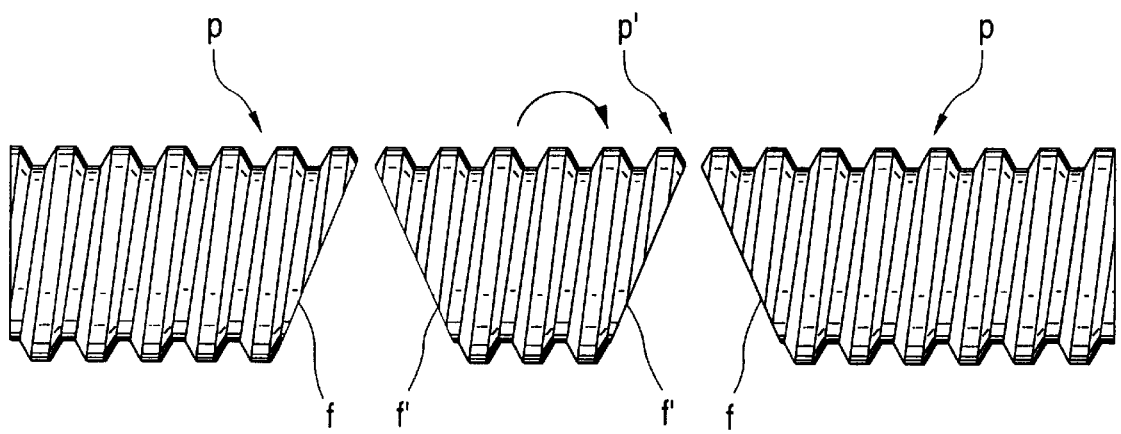
FIG. 17 is a plan view of the pipe blank shown in FIG. 16, showing the state thereof after the posture is changed.
Figure 18:
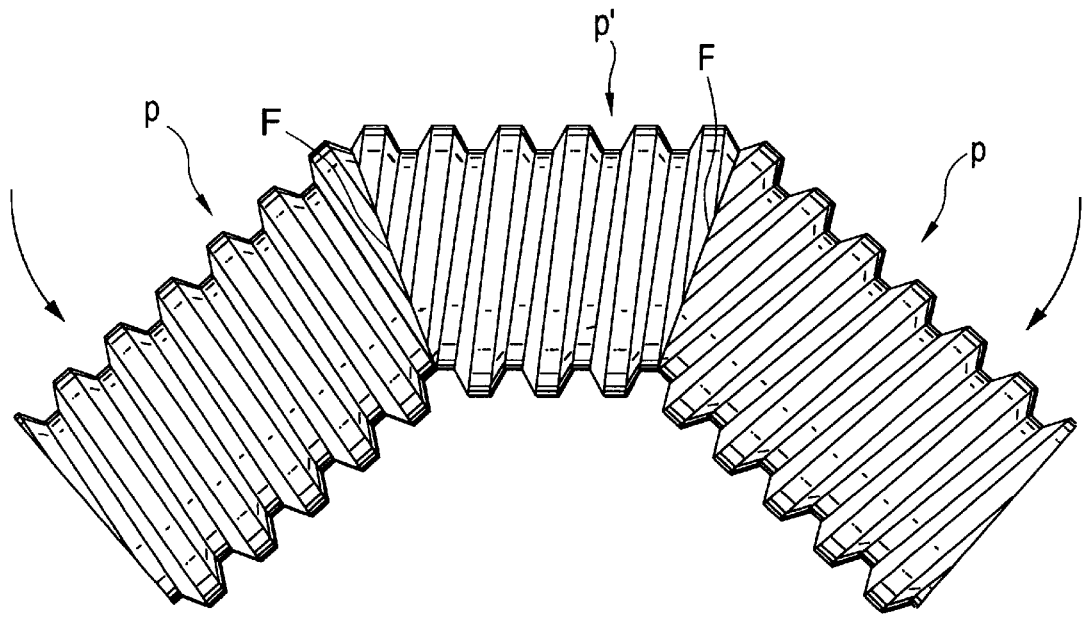
FIG. 18 is a plan view of the pipe blank shown in FIG. 17, showing the state thereof after the posture is changed.
Figure 19:
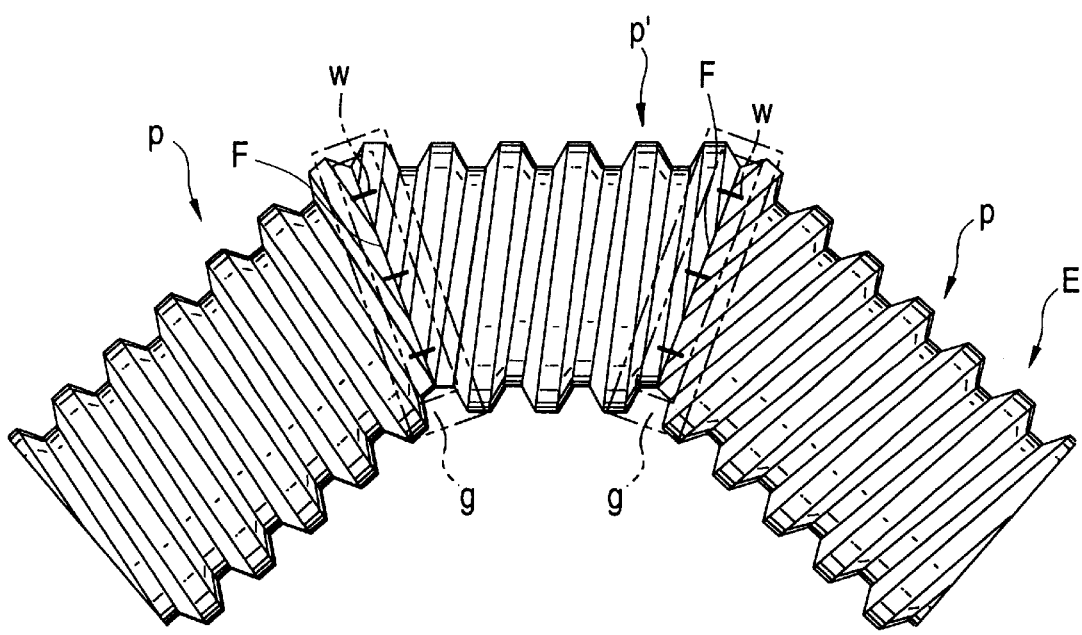
FIG. 19 is a plan view of a conventional elbow in which the pipe blank shown in FIG. 18 is connected.

FIGS. 7 to 9 respectively show elbows E respectively according to another embodiments of the invention. In particular, to manufacture an elbow E shown in FIG. 7, one valley portion 3 of the middle portion of the pipe blank 1A in the longitudinal direction thereof is heated and bent. After then, while a next valley portion 3 adjoining the thus heated and bent valley portion is left untreated, a further adjoining valley portion 3 is heated and bent. That is, this type of working process is repeated sequentially to thereby produce an elbow E which has a bent radius larger than that of the elbow E shown in FIG. 1, but the elbow E has a bent angle α of 45°, namely, same angle as the elbow E shown in FIG. 1.

In an elbow E shown in FIG. 8, while the central portion of the pipe blank 1A in the longitudinal direction thereof is left unworked, four valleys 3 , in either of the two side portions of the unworked central portion, similarly to the elbow E shown in FIG. 1, are successively heated and bent and the bent angle α of the whole of the elbow E is set for an angle of 90°.

Furthermore, in an elbow E shown in FIG. 9, eight adjoining valleys 3 in the middle portion of the pipe blank 1A in the longitudinal direction thereof are successively heated and bent and, as in the elbow E shown in FIG. 8, the whole of the elbow E is bent formed in such a manner as to have a bent angle of 90°.

In FIG. 9, a fan-like portion shown by a chained line is an elbow reinforcing body R, here, there is shown a state in which a PE resin sheet is stuck on the outer periphery of the elbow E. Moreover, the elbow E may also be reinforced by applying FRP resin or PE fused resin onto the outer periphery of the elbow, or by winding or sticking unwoven cloth or the like onto the outer periphery of the elbow.

Although description has been given heretofore of the typical embodiments of the invention, the present invention is not always limited to the structures employed in those embodiments. For example, the bent angle of the elbow may be set for an angle of 30°, an angle of 60°, or any other arbitrary angles. That is, the structures illustrated herein can be changed properly, provided that such changed structures can satisfy the above-mentioned required conditions, are able to attain the expected object of the invention, and can provide the following effects.

As can be clearly understood from the foregoing description, according to the present invention, an elbow can be produced without employing a conventional method in which a pipe member is cut once into two pipe sections and, after then, the cut surfaces of the two pipe sections are connected together again. In a method according to the present invention, pipe blank itself is heated and is then welded together or deformed plastically to thereby produce an elbow having a given bent angle, so that no joint portion is formed in the pipe wall of the elbow. Therefore, even if the thus finished elbow is handled roughly during transportation, or even if, after the elbow is buried in the ground, the ground pressure or the like is applied to the elbow in a biased load manner, there is no fear that water can leak in the elbow, which can provide an outstanding effect that the present elbow can be safely used as a non-leakage elbow.

Although the elbow manufacturing method according to the present invention is means for manufacturing the above-mentioned non-leakage elbow, there is no need to cut a pipe once and connect together the cut pipe members again. Therefore, the method according to the present invention can provide an effect that an elbow of no leakage can be manufactured easily and quickly.

The present invention is based on Japanese Patent Application No. Hei. 9-369514, herein.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A corrugated resin elbow comprising:
    a deformed portion located at an intermediate position between the both ends in the longitudinal direction of said pipe wall and at a part of the pipe wall in a circumferential direction thereof,
    wherein said pipe wall is bent into a bent attitude having a given angle about said deformed portion by locally heating and compressedly deforming said deformed portion;
    keeping means for keeping the bent attitude permanently by welding the deformed portion of said pipe wall.

2. The corrugated resin elbow according to claim 1, wherein said deformed portion comprises a valley portion, a ridge portion and a side wall located between said valley portion and said ridge portion.

3. The corrugated resin elbow according to claim 2, wherein said deformed portion comprises at least two adjacent ridge portions wherein adjacent ridge portions are welded together.

4. The corrugated resin elbow according to claim 1, wherein said deformed portion comprises at least two adjacent side walls between which said valley portion is interposed wherein the adjacent side walls are welded together.

5. The corrugated resin elbow according to claim 1, wherein the corrugated form of said pipe wall is one of a spirally corrugated form and an annularly corrugated form.

6. The corrugated resin elbow according to claim 1, wherein said pipe wall has a single wall structure consisting only of a corrugated wall.

7. The corrugated resin elbow according to claim 1, wherein said pipe wall has a double-wall structure including a corrugated main wall and a cylindrical-shaped inner wall formed in the interior of said main wall.

8. A corrugated resin elbow made from a corrugated synthetic resin pipe wall comprising:
    a deformed portion located at an intermediate position between the both ends in a longitudinal direction of said pipe wall and at a part of the pipe wall in a circumferential direction thereof, wherein said pipe wall is bent into a bent attitude having a given angle about said deformed portion by compressedly heating and deforming said deformed portion; and
    a keeping member keeping the bend attitude permanently.

9. The corrugated resin elbow according to claim 8, wherein said deformed portion comprises at least two adjacent ridge portions and said keeping member is a resin for welding side surfaces of the adjacent ridge portions together.

10. The corrugated resin elbow according to claim 8, wherein said keeping member is a reinforcing body which is made of one of PE resin and FRP resin and formed on an outer periphery of the elbow.

11. The corrugated resin elbow according to claim 10, wherein the reinforcing body is a PE resin sheet stuck on the outer periphery of the elbow.

* * * * *